US006971119B1

(12) United States Patent
Arsenault et al.

(10) Patent No.: US 6,971,119 B1
(45) Date of Patent: Nov. 29, 2005

(54) METHOD AND APPARATUS FOR TRANSMISSION, RECEIPT, CACHING AND DISPLAY OF ONE-WAY BROADCAST PROGRAMMING AND DATA

(75) Inventors: Robert G. Arsenault, Redondo Beach, CA (US); Jeffrey A. Brown, Roseville, MN (US); Philip E. Hsiao, Eden Prairie, MN (US); Tam T. Leminh, Cypress, CA (US); Craig A. Finseth, St. Paul, MN (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 09/534,898

(22) Filed: Mar. 24, 2000

Related U.S. Application Data (60) Provisional application No. 60/126,574, filed on Mar. 29, 1999.

(51) Int. Cl.[7] .................... H04N 7/173; H04N 5/445; H04N 7/16; G06F 3/00; G06F 13/00
(52) U.S. Cl. .................... 725/89; 725/35; 725/39; 725/40; 725/50; 725/55; 725/86; 725/93; 725/94; 725/97; 725/134; 725/142
(58) Field of Search .................... 725/86–97, 100, 725/134, 39–40, 142, 140, 55, 50, 35, 131–133, 725/139, 141, 151–153

(56) References Cited

U.S. PATENT DOCUMENTS

| 4,855,730 | A |   | 8/1989  | Venners et al. |         |
|-----------|---|---|---------|----------------|---------|
| 5,293,357 | A |   | 3/1994  | Hallenbeck     |         |
| 5,404,505 | A | * | 4/1995  | Levinson ....................... 707/10 |
| 5,418,621 | A |   | 5/1995  | Park           |         |
| 5,515,106 | A | * | 5/1996  | Chaney et al. ................. 725/48 |
| 5,534,911 | A |   | 7/1996  | Levitan        |         |
| 5,634,012 | A | * | 5/1997  | Stefik et al. ................... 705/39 |
| 5,642,153 | A | * | 6/1997  | Chaney et al. ................. 725/40 |
| 5,710,970 | A | * | 1/1998  | Walters et al. ................ 725/87 |
| 5,719,943 | A |   | 2/1998  | Amada et al.   |         |
| 5,761,607 | A | * | 6/1998  | Gudesen ....................... 725/89 |
| 5,790,935 | A | * | 8/1998  | Payton ......................... 725/91 |
| 5,805,763 | A | * | 9/1998  | Lawler et al. ................. 386/83 |
| 5,815,671 | A | * | 9/1998  | Morrison ...................... 725/35 |
| 5,841,979 | A | * | 11/1998 | Schulhof et al. ............. 709/237 |
| 5,850,218 | A |   | 12/1998 | LaJoie et al. ................. 725/45 |
| 5,861,906 | A |   | 1/1999  | Dunn et al.     |         |
| 5,867,207 | A | * | 2/1999  | Chaney et al. ................. 725/54 |
| 5,933,500 | A |   | 8/1999  | Blatter et al. ............... 380/200 |
| 6,005,561 | A | * | 12/1999 | Hawkins et al. .......... 715/500.1 |
| 6,233,389 | B1|   | 5/2001  | Barton et al. ................. 386/46 |
| 6,374,404 | B1|   | 4/2002  | Brotz et al.    |         |
| 6,424,947 | B1| * | 7/2002  | Tsuria et al. ................... 705/1 |
| 6,438,596 | B1| * | 8/2002  | Ueno et al. ................. 709/226 |
| 6,701,528 | B1| * | 3/2004  | Arsenault et al. ............ 725/89 |
| 2002/0054752 | A1 | * | 5/2002 | Wood et al. ................. 386/83 |

* cited by examiner

*Primary Examiner*—John Miller
*Assistant Examiner*—Michael W. Hoye
(74) *Attorney, Agent, or Firm*—Georgann S. Grunebach (57) ABSTRACT

The present invention is a method and apparatus for transmitting, receiving, storing and displaying television program data. The method includes transmitting data including scheduled program data, program guide data, and cache program data. The method further includes receiving the transmitted data and storing the cache program data. Once a cache television program is selected, the cache program data corresponding to the selected cache television program is retrieved, and a display of the television program is generated for viewing.

23 Claims, 8 Drawing Sheets

METHOD AND APPARATUS FOR TRANSMISSION, RECEIPT, CACHING AND DISPLAY OF ONE-WAY BROADCAST PROGRAMMING AND DATA

CROSS-REFERENCE TO RELATED APPLICATION(S)

This application is a non-provisional application claiming priority from Provisional Application Ser. No. 60/126, 574 entitled "Method And Apparatus For Transmission, Receipt, Caching and Display Of One-Way Broadcast Programming And Data" filed Mar. 29, 1999.

FIELD OF THE INVENTION

The present invention relates to electronic provision of television content, and particularly to apparatus and method for the transmit, receipt, cache and display of one-way broadcast, programming and data and more specifically to the direct cache storage of program data.

BACKGROUND OF THE INVENTION

The present invention relates to the provision of television content, and particularly to a method and apparatus for transmitting, receiving, caching and displaying one-way broadcast programming and data, including audio, video and data.

Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

Channel numbers are typically used to identify the stream of television content offered by a content provider. Program guide information is typically transmitted along with the television content. The program guide information includes a set of channel definition parameters that define which portions of the transmitted television content are associated with the various channels, and typically also includes schedule information for display on users' televisions. The schedule information informs users what television programs are currently on, and what television programs will be shown in the near future.

Receiving devices decode the program guide information and television content. When a user tunes to a particular channel, the user's receiving device uses the channel definition parameters for the chosen channel to link the television content portions associated with the chosen channel and provide the channel content to the user. More specifically, existing analog broadcast television systems use a fixed mapping between channel numbers and the channel definition parameters. In analog broadcast television systems, the channel definition parameters are frequencies. Each frequency or set of frequencies is mapped to a particular channel. The upcoming digital broadcast television systems require the receiving device to search among a small, fixed list of parameters to locate television content portions. Once located, the television content portions in digital systems remain unchanged for relatively long periods.

Satellite broadcasting systems are primarily one-way communication systems. Such one-way systems do not allow the viewer to control the time and rate of viewing programming. The viewer can only change channels or select to view a program at a predetermined time as instructed via the programming guide. It would be desirable to enhance the viewing experience and to increase the flexibility of the satellite broadcasting system or other one-way broadcasting systems to allow the viewer to have more control over the time and rate of viewing the programming.

Current receiving devices in satellite broadcasting systems do not provide storage media capable of storing entire movies or other entertainment programming. It would be desirable in a satellite broadcasting system to be able to send programming for local storage at a receiving device. Sending programming for local storage and later viewing allows for greater flexibility to both the service provider and the subscriber. Programming can be sent less frequently or at differing rates, freeing up valuable bandwidth. The subscriber can view locally stored programming at a later time with full on demand features such as the ability to pause and rewind movies.

Current recording devices used for recording television programming, such as a VCR, are designed to receive and record unencrypted television signals. However, one-way type broadcasting systems regularly utilize encryption techniques and access control measures over transmitted signals. Broadcasters restrict access to transmitted television programming and data based on service subscription criteria.

BRIEF SUMMARY OF THE INVENTION

The present invention is a method and apparatus for transmitting, receiving, directly caching, storing and displaying one-way broadcast programming and data, such as satellite broadcast programming and data. The apparatus includes a transmission station and a plurality of receiver stations. The transmission station creates program guide data that is in an "object" format. The transmission station combines the program guide objects with digital audio and video television signals, and transmits an output stream to the plurality of receiver stations. Each of the plurality of receiver stations receives the transmitted output stream and identifies the electronic program guide objects within the output stream. Each of the plurality of receiver stations stores the identified electronic program guide objects.

Each of the plurality of receiver stations further includes an additional data storage device capable of storing full length feature movies. Either at the request of the subscriber or at the decision of the broadcaster based on service subscription criteria, certain programming is designated for local storage by a cache identifier. The designated program is transmitted by the transmission station to each of the plurality of receiver stations. Each of the plurality of receiver stations receives the designated program and evaluates the cache identifier. Appropriate receiver stations recognize the cache identifier and store the designated program in the additional data storage device.

Also in the present invention, the subscriber controls the playback of the program or movie stored in the additional data storage device. The subscriber has full on-demand capabilities by choosing when to watch the stored program and having ability to pause, rewind and fast forward the program.

Also in the present invention, the service provider has the capability to transmit the designated program at varying rates. The designated program can be transmitted real time, in a high speed data burst or at a trickle rate over time. The service provider chooses an appropriate transmission rate to maximize subscribers' satisfaction while minimizing required bandwidth.

DETAILED DESCRIPTION

I. Transmission of Television Content and Program Guide Data

Figure 1:
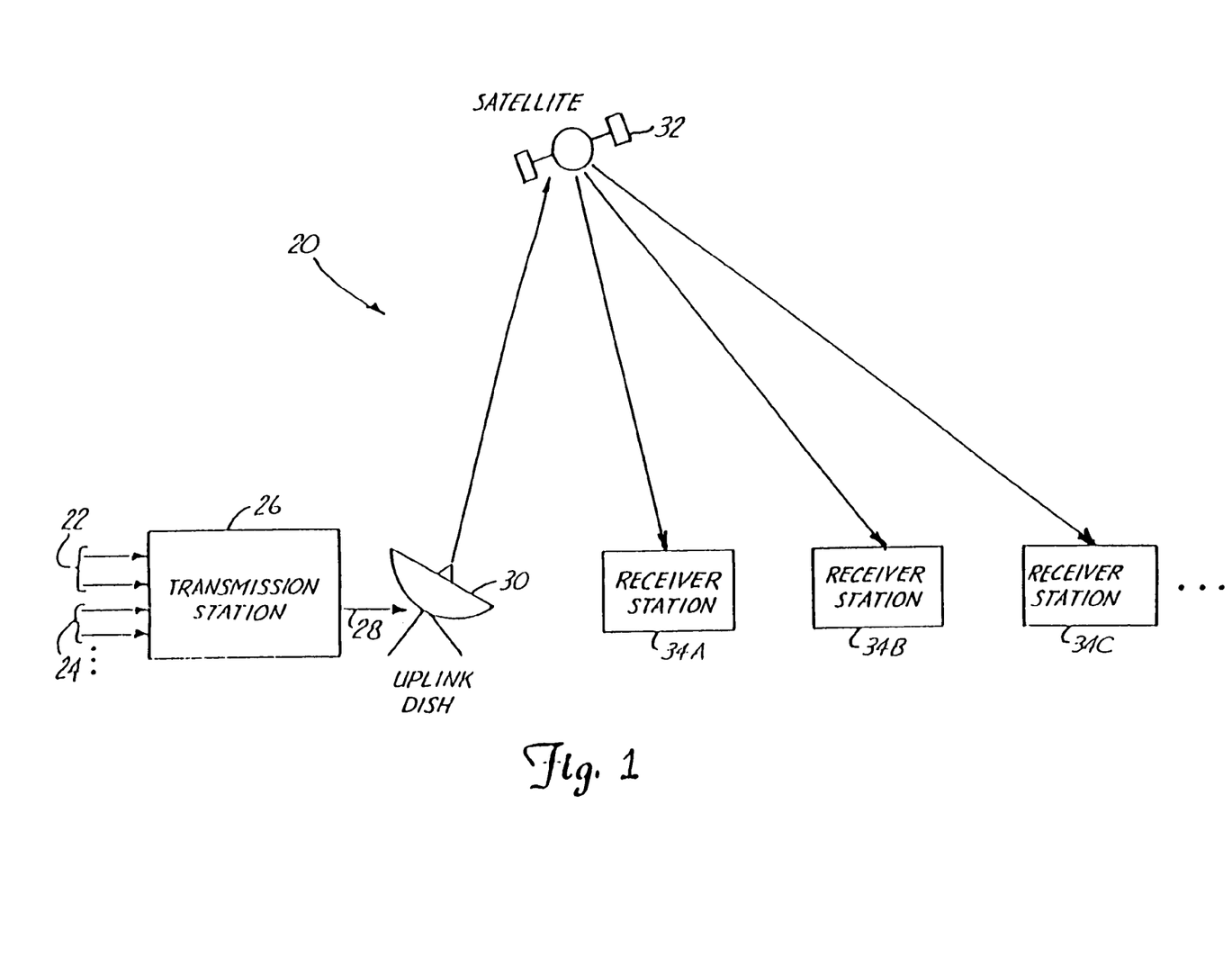
FIG. 1 is a block diagram of a preferred embodiment of a television broadcasting system for the transmission, receipt, caching and display of television content and electronic program guide data.

FIG. 1 is a block diagram of television broadcasting system 20, which transmits and receives audio, video and data signals via satellite. Although the present invention is described in the context of a satellite-based television broadcasting system, the techniques described herein are equally applicable to other methods of television content delivery, such as one-way directional over-the-air and cable-based systems.

Television broadcasting system 20 includes transmission station 26, uplink dish 30, satellite 32, and receiver stations 34A–34C (collectively referred to as receiver stations 34). Transmission station 26 includes a plurality of input lines 22 for receiving various signals, such as analog television signals, digital television signals, video tape signals, original programming signals and computer generated signals containing HTML content. Additionally, input lines 22 receive signals from digital video severs having hard discs or other digital storage media. Each input line 22 typically corresponds to a single television channel. Transmission station 26 also includes a plurality of schedule feeds 24, which provide electronic schedule information about the timing and content of various television channels, such as that found in television schedules contained in newspapers and television guides. The electronic schedule information from schedule feeds 24 is converted into program guide data by transmission station 26.

Transmission station 26 receives and processes the various input signals received on input lines 22 and schedule feeds 24, converts the received signals into a standard form, combines the standard signals into a single output data stream 28, and continuously sends output data stream 28 to uplink dish 30. Output data stream 28 is preferably a modulated signal, which is modulated by transmission station 26 using standard frequency and polarization modulation techniques. In a preferred embodiment, output data stream 28 is a multiplexed signal including 16 frequency bands. Transmission station 26 is described in further detail below with respect to FIG. 2.

Uplink dish 30 continuously receives output data stream 28 from transmission station 26, amplifies the received signal and transmits the signal to satellite 32. Although a single uplink dish and satellite are shown in FIG. 1, multiple dishes and satellites are preferably used to provide additional bandwidth, and to help ensure continuous delivery of signals.

Satellite 32 revolves in geosynchronous orbit about the earth. Satellite 32 includes a plurality of transponders that receive signals transmitted by uplink dish 30, amplify the received signals, frequency shift the received signals to higher frequency bands, and then transmit the amplified, frequency shifted signals back to receiver stations 34. A total of 32 transponders are preferably used in the present invention.

Receiver stations 34 receive and process the signals transmitted by satellite 32. Receiver stations 34 include hardware and software for separating the electronic program guide data from the received signals and processing the electronic program guide data. Receiver stations 34 also include hardware and software for receiving and caching program data and controlling the playback of cache program data. Receiver stations 34 are described in further detail below with respect to FIG. 3.

Figure 2:
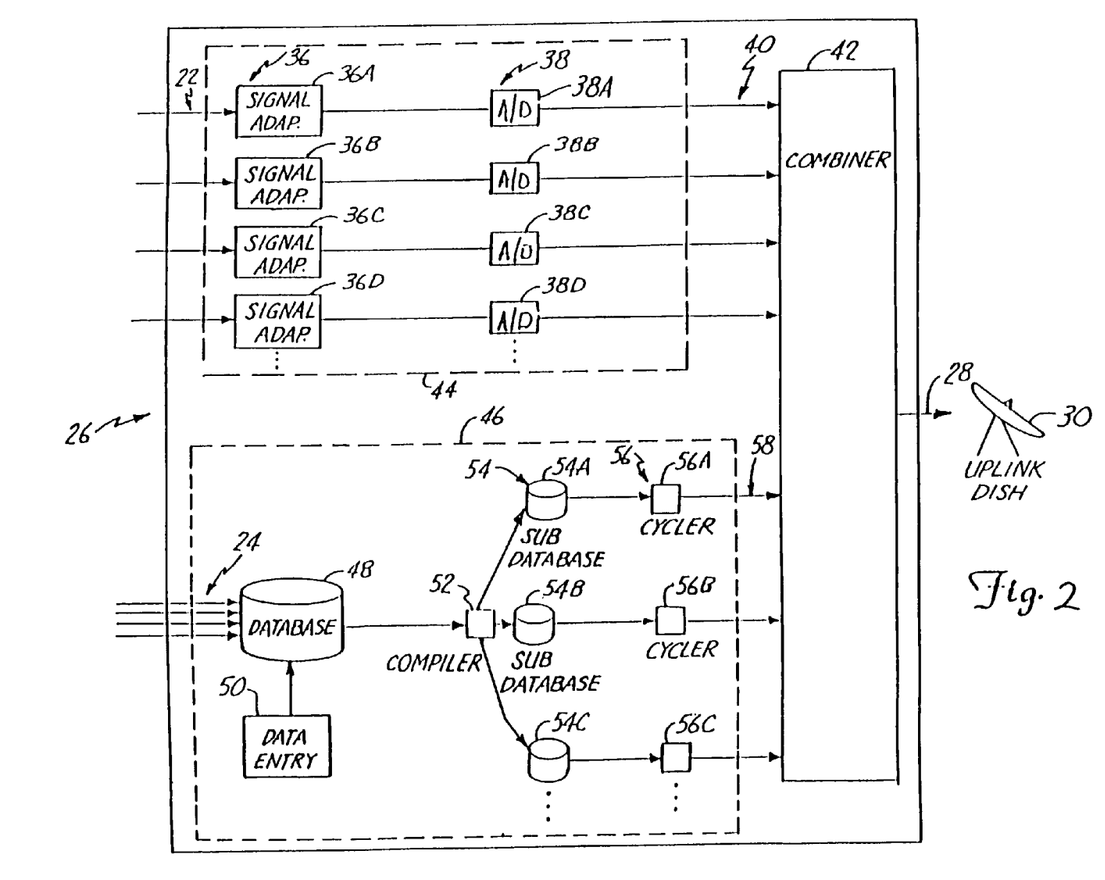
FIG. 2 is a block diagram of the transmission station of the system shown in FIG. 1.

FIG. 2 is a block diagram of transmission station 26. Transmission station 26 includes program transmitting system 44 and program guide transmitting system 46.

Program transmitting system 44 includes input signal adapters 36A–36D (collectively referred to as input signal adapters 36), analog to digital (A/D) converters 38A–38D (collectively referred to as A/D converters 38), and combiner 42. Input signal adapters 36 are coupled to A/D converters 38, and A/D converters 38 are coupled to combiner 42. Although four input signal adapters 36 and four A/D converters 38 are shown in FIG. 2, several more will typically be used in commercial systems.

Input signal adapters 36 receive input signals from input lines 22, and convert the input signals to a standard form. As mentioned above, signals from input lines 22 include analog television signals, digital television signals, video tape signals, original programming signals, computer generated signals containing HTML content and digital video server signals. Also, input lines 22 can receive signals from digital video servers having hard discs or other digital storage media. Input signal adapters 36 preferably convert the input signals to a high quality analog format. The high quality analog signals are output by input signal adapters 36 to A/D converters 38. A/D converters 38 convert the analog signals received from input signal adapters 36 to digital signals, and compress the digital signals using MPEG2 encoding, although other compression schemes may be used.

During the MPEG2 encoding step, A/D converters 38 also perform a statistical multiplexing operation. During the statistical multiplexing operation, A/D converters 38 determine the amount of bandwidth that each channel will use. The amount of bandwidth allowed for each channel is determined based upon the content of the signal on that channel, and the amount of bandwidth used by other channels. For a program such as the motion picture "Independence Day", which has a very dynamic picture content with a great deal of movement and numerous bright explosions, the signal can not be compressed as much as a more static video signal like an information channel. The greater the dynamic content of the signal, the less it can be compressed and the greater the bandwidth required.

Typically, 30 Mega bits of data per second are transmitted by uplink dish 30 for each transponder in satellite 32. Each transponder receives and transmits data for about 6 channels. Thus, each channel occupies approximately 5 Mega bits of data per second, on average. During the statistical multiplexing operation, the amount of compression for each channel, and correspondingly the amount of information transmitted for each channel, is adjusted up or down depending upon the amount of available space for each transponder. Combiner 42 feeds back information to A/D converters 38 during the statistical multiplexing operation, informing A/D converters 38 of the amount of bandwidth used by various channels. A/D converters 38 then adjust the amount of compression of a signal based on the information fed back from combiner 42.

The MPEG2 encoded digital data are output by A/D converters 38 to combiner 42. Combiner 42 groups the MPEG2 encoded digital data from each A/D converter 38 into a plurality of packets, with each such packet marked with a service channel identification (SCID) number. The SCIDs are later used by receiver 64 (shown in FIG. 3) to identify the packets that correspond to each television channel. Combiner 42 combines all of the packets for all of the channels, adds error correction data, and outputs a single output data stream 28 to uplink dish 30.

Program transmitting system 44 processes audio signals in the same manner as video signals, and combiner 42 combines digital audio signals with the digital video signals. Combiner 42 also receives electronic program guide data from input lines 58 (as described below with respect to the program guide transmitting system 46) and adds that data to output data stream 28. The assembly and processing of the electronic program guide data prior to it being sent to combiner 42 is described in more detail below.

Output data stream 28, which is output by combiner 42, is a multiplexed signal that is modulated by combiner 42 using standard frequency and polarization modulation techniques. Output data stream 28 preferably includes 16 frequency bands, with each frequency band being either left polarized or right polarized. Since there are 32 transponders in the preferred embodiment, each of the 16 frequency bands are shared by two transponders. Therefore, transponder 1 is assigned frequency 1, left polarization; transponder 2 is assigned frequency 1, right polarization; transponder 3 is assigned frequency 2, left polarization, etc.

Also shown in FIG. 2 is a block diagram of program guide transmitting system 46, which is a part of transmission station 26. Program guide transmitting system 46 includes program guide database 48, compiler 52, sub-databases 54A–54C (collectively referred to as sub-databases 54) and cyclers 56A–56C (collectively referred to as cyclers 56).

Schedule feeds 24 provide electronic schedule information about the timing and content of various television channels, such as that found in television schedules contained in newspapers and television guides. Schedule feeds 24 also provide HTML content.

Program guide database 48 is a computer-based system that receives data from schedule feeds 24 and organizes the data into program guide data in a standard format. Program guide data and schedule data may also be manually entered into program guide database 48 through data entry station 50. Compiler 52 reads the standard form program guide data out of program guide database 48, converts the program guide data into the proper format for transmission to users (specifically, the program guide data is converted into objects as discussed below) and outputs the program guide data to one or more of sub-databases 54.

The program guide objects are temporarily stored in sub-databases 54 until cyclers 56 request the information. Each of cyclers 56 preferably transmits program guide objects to combiner 42 at a different rate than the other cyclers 56. For example, cycler 56A may transmit program guide objects to combiner 42 every second, while cyclers 56B and 56C may transmit program guide objects every 5 seconds and every 10 seconds, respectively.

Since receiver 64 (shown in FIG. 3) may not always be on and receiving and saving 17 program guide objects, the program guide objects must be continuously re-transmitted. Program guide objects for programs that will be shown in the next couple of hours are sent more frequently than program guide objects for programs that will be shown in 12 hours or more. Thus, the program guide objects for the most current programs are sent to a cycler 56 with a high rate of transmission, while program guide objects for later programs are sent to cyclers 56 with a lower rate of transmission.

All of the program guide objects output by the plurality of cyclers 56 are combined by combiner 42. Combiner 42 combines the program guide objects with the digital video and audio data output by A/D converters 38 on input lines 40. Combiner 42 transmits output data stream 28, which includes the program guide data and the digital video and audio data, to uplink dish 30.

II. Format of Transmitted Program Guide Data

Prior to transmitting program guide data to sub-databases 54, compiler 52 organizes the program guide data from program guide database 48 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television, and is also used for channel definition parameters.

Figure 3:
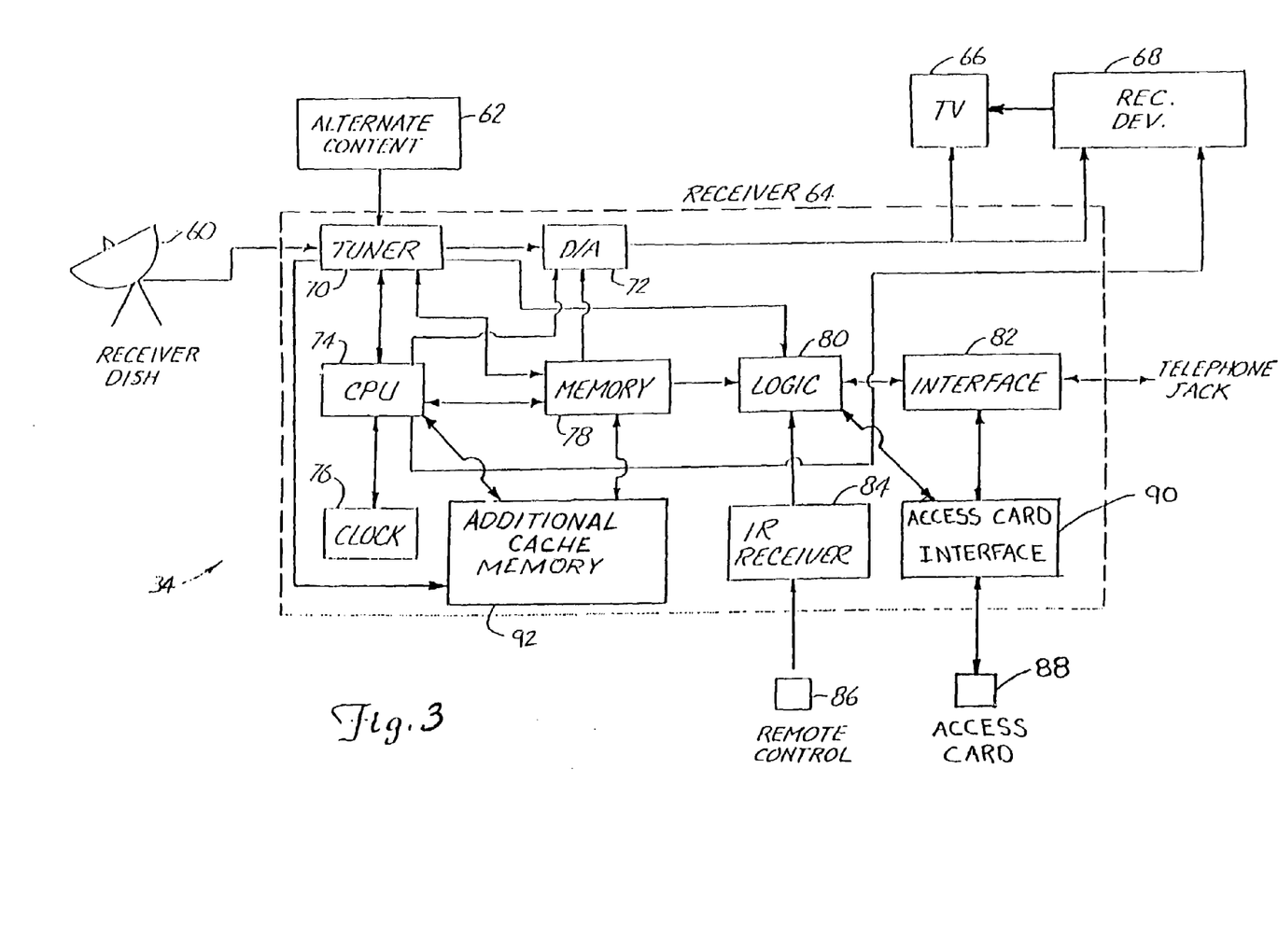
FIG. 3 is a block diagram of a receiver station for receiving, decoding and caching audio, video and data signals.

Prior to transmission, each object is preferably broken down by compiler 52 into multiple frames. Each frame is made up of a plurality of 126 byte packets. Each frame includes a frame header, program guide data and a checksum. Each frame header includes the same information as the object header described above—object type, object ID and version number. The frame header uniquely identifies the frame, and its position within a group of frames that make up an object. The checksum is examined by receiver 64 to verify the accuracy of the data within received frames.

The present invention uses over 15 different object types. The objects that are used for providing channel definition parameters include boot objects, channel list objects, channel objects and conditional objects. Other objects, such as HTML (Hyper Text Markup Language) objects, are used to provide channel content. Still further objects, such as general program objects, general schedule objects and master schedule objects are used by receiver 64 to generate a display of a program guide on a user's television.

A boot object identifies the SCIDs where all other objects can be found. A boot object is always transmitted on the same channel, which means that each packet of data that makes up a boot object is marked with the same SCID number. Boot objects are transmitted frequently to ensure that receivers 64 that have been shut off, and are then turned back on, immediately receive information indicating the location of the various program guide objects. Thus, boot objects are sent from compiler 52 to a cycler 56 with a high rate of transmission.

Each boot object includes frequency descriptors that define frequency tables. A frequency table lists frequencies and, for each frequency, a corresponding frequency index. Each frequency table lists frequencies and corresponding frequency indices for a single network. A network is a grouping of all channels from a common source, such as all Digital Satellite System (DSS) channels. Other networks include all NTSC channels or all ATSC channels. Thus, each channel frequency is represented by a particular frequency index number.

A channel list object contains a list of all the channel objects (discussed below) in a network. For each channel object in the list of channel objects, the channel list object includes a channel object ID for that channel object. Each channel object is uniquely identified by its channel object ID.

Each channel object provides information about a particular channel. Each channel object includes multiple fields or descriptors that provide information about that channel. Each channel object includes fields for a "name", a "logo indicator" and a "logo index". The "name" field of a channel object provides a name of the channel. The "logo indicator" is preferably a one bit field that, when set to "1", indicates that the channel object contains a logo index, and when set to "0", indicates that the channel object does not contain a logo index. The "logo index" field identifies the logo index for the channel as defined in a logo index table. The logo index table is a table of logos, with each logo having an associated logo index. The following is an example of a portion of a logo index table:

| Logo Index | Logo |
|---|---|
| 1 | Disney |
| 2 | ESPN |
| 3 | CNN |
| 4 | Family channel |
| 5 | HBO |

Each descriptor in a channel object includes a descriptor type ID that indicates the type of the descriptor. Descriptor types include "about" descriptors, "category" descriptors, "reserved" descriptors and "channel content" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Reserved" descriptors are saved for future improvements to the system. "Channel content" descriptors are discussed below after a description of channel definitions.

Each channel object includes a variable length "channel definition" field. The channel definition field defines the composition of the channel, and is later used by receiver 64 to reconstruct the channel components (e.g., audio, video and data). The channel definition field includes a plurality of sub-fields, and conditional logic that preferably consists of multiple "if-then" statements. One of the sub-fields is a service paradigm indicator (SPI). Each SPI identifies an entry in a channel composition table. The channel composition table defines the type of channel components for the various SPIs. The following is an example of a channel composition table:

| SPI | Channel Composition |
|---|---|
| 01 | Explicit List |
| 02 | DSS - General TV (GTV) |
| 03 | DSS - GTV + Continuous Data (CD) |
| 04 | DSS - GTV + Session Data (SD) |
| 05 | DSS - GTV + Data Annotation Video (DAVID) |
| 06 | DSS - GTV + DAVID + AC3 (Dolby digital audio compression) |
| 07 | DSS - General Audio |
| 08 | DSS - CD |
| 09 | DSS - SD |
| 10 | DSS - High Speed Data |
| 11 | ATSC Service Channel |
| 12 | NTSC Service Channel |
| 13 | HTML |
| 14 | HTML + base type (e.g., DSS, ATSC or NTSC) |

Other entries may also be included in the channel composition table, such as Language Preference TV entries and reserved entries. As can be seen from the channel composition table, channels can be comprised of DSS content, ATSC content, NTSC content, HTML content, or HTML content combined with DSS content, or ATSC content or NTSC content. Channel content can also be expressly defined.

In the channel definition field of a channel object, an SPI is used in a series of "if- then" statements. Each "if-then" statement is followed by a series of channel definition parameters. The "if-then" statements compare the SPI to various numbers or ranges of numbers, and the channel definition parameters that follow the "if-then" statement are used only if the "if-then" comparison results in a match (e.g., if SPI=11, then use the following ATSC parameters).

Channel definition parameters for DSS channels include a transponder parameter and a root SCID parameter. The transponder parameter identifies an index in a frequency table for a DSS network. As discussed above, the frequency table is defined by a frequency descriptor. The root SCID parameter is used in conjunction with the SPI to identify the video, audio and/or data SCIDs for the channel. ATSC channels use two parameters—an ATSC channel number parameter and an ATSC program number parameter. NTSC channels use a single parameter—an NTSC channel number parameter. HTML channels use one parameter—an HTML object ID parameter. The HTML object ID parameter identifies the object IDs for the HTML objects needed to construct the HTML channel.

In addition to defining channels as ATSC channels, NTSC channels, etc., channel content may also be explicitly defined. For channels that are explicitly defined, the following channel definition parameters are preferably used—service type parameter, transponder or channel number parameter, and SCID or program number parameter. The service type parameter indicates a type of service, such as an audio type (e.g., Dolby Digital AC3), video type (e.g., DAVID), channel type (e.g., NTSC or ATSC) or data type (e.g., high speed data). The transponder or channel number parameter identifies either an index in a frequency table for a DSS network, or a channel number for an ATSC network or an NTSC network. The SCID or program number parameter identifies a SCID for a DSS network, or a program number for an ATSC network.

Channel objects may also include a channel content descriptor. Channel content descriptors provide additional definitions of the channel. Channel content descriptors use conditional logic, such as "if-then" statements, to test various conditions. A set of "if-then" statements is associated with each channel definition. If the condition or conditions in an "if-then" statement are satisfied, the channel definition associated with that "if-then" statement is used to define the channel content.

Another type of object is a conditional object. A conditional object contains an object that is preceded by a conditional expression. If the expression is evaluated to "TRUE", the object within is valid and is processed accordingly. If the expression is evaluated to "FALSE", the object within is ignored. A conditional object can contain multiple conditional expressions, so that it is processed only if all of the conditional expressions are evaluated to "TRUE".

III. Receipt and Processing of Data Including Program Guide Data

FIG. 3 is a block diagram of one of receiver stations 34, which receives and decodes audio, video and data signals. Receiver station 34 includes receiver dish 60, receiver 64, television 66, alternate content source 62, recording device 68, remote control 86 and access card 88. Receiver 64 includes tuner 70, digital-to-analog (D/A) converter 72, CPU 74, clock 76, memory 78, logic circuit 80, interface 82, infrared (IR) receiver 84, access card interface 90 and additional cache memory 92.

Receiver dish 60 receives signals sent by satellite 32, amplifies the signals and passes the signals on to tuner 70. Tuner 70 operates under control of CPU 74. Tuner 70 is preferably three separate tuners; a first tuner for tuning to digital DSS and ATSC channels, a second tuner for tuning to analog NTSC channels, and a third tuner for tuning to incoming cache data. The functions performed by CPU 74 are controlled by a control program stored in memory 78. Memory 78 along with access card 88 store a variety of parameters for receiver 64 such as a list of channels receiver 64 is authorized to process and generate displays for, the zip code and area code for the area in which receiver 64 is used, and the model number of receiver 64. Access card 88 is removable from receiver 64 (as shown in FIG. 3) and provides data to memory 78 identifying the services/channels available to receiver 64. Access card 88 is coupled to access card interface 90, which communicates via interface 82 to a customer service center (not pictured). Access card 88 receives access authorization information from the customer service center based on a user's particular account information. In addition, access card 88 and the customer service center communicate regarding billing and ordering of services.

Clock 76 provides the current local time to CPU 74. Interface 82 is preferably coupled to a telephone jack at the site of receiver station 34 and allows receiver 64 to communicate with transmission station 26 via telephone lines. Interface 82 may also be used to transfer data to and from a network, such as the Internet.

The signals sent from receiver dish 60 to tuner 70 are digital signals that are grouped into a plurality of packets. Each packet includes a header that identifies the SCID number for the packet, and the type of data contained in the packet (e.g, audio data, video data, caching audio data, caching video data, auxiliary caching data or program guide data). Tuner 70 includes multiple output lines for transmitting audio data, video data, caching audio data, caching video data and program guide data. As packets are received from receiver dish 60, tuner 70 identifies the type of each packet and outputs each packet on the appropriate output line, as discussed in more detail below. If tuner 70 identifies a packet as program guide data, tuner 70 outputs the packet to memory 78. Program guide data is stored in a guide database in memory 78.

If tuner 70 identifies a packet as caching data, tuner 70 outputs the packet to additional cache memory 92, where it is stored in a data file. Cache data can be stored in a variety of formats. Typically, additional cache memory 92 will store data in the same MPEG format as it was received, although cache data could be stored in a decrypted format. CPU 74 creates an MPEG, or another appropriate format (e.g., AVI, Quick Time, etc.), data file to store cache data in additional cache memory 92. Additional cache memory 92 can be a hard disc drive or other suitable memory device with a large storage capacity, preferably at least 3 Gigabytes. With current encoding techniques, a typical movie requires 3–4 Gigabytes of memory.

In addition to the digital satellite signals received by receiver dish 60, other sources of television content are also preferably used. For example, alternate content source 62 provides additional television content to television 66. Alternate content source 62 is coupled to tuner 70. Alternate content source 62 can be an antenna for receiving off the air NTSC signals, a cable for receiving ATSC signals, or other content source. Although only one alternate content source 62 is shown, multiple sources can be used.

Initially, as data enters receiver 64, tuner 70 looks for a boot object. Boot objects are always transmitted with the same SCID, so tuner 70 knows that it must look for packets marked with that SCID. A boot object identifies the SCIDs where all other program guide objects and all cache program objects can be found. The information from the boot object is used by tuner 70 to identify packets of program guide data and route them to memory 78 and to identify packets of cache program data and route them to additional cache memory 92.

As program guide data is received and stored in the guide database in memory 78, CPU 74 performs various operations on the data in preparation for displaying a program guide on television 66. These operations include packet assembly, object assembly and object processing.

The first operation performed on the program guide data stored in the guide database in memory 78 is packet assembly. During the packet assembly operation, CPU 74 examines the stored program guide data and determines the locations of the packet boundaries.

The next step performed by CPU 74 is object assembly. During the object assembly step, CPU 74 combines packets to create object frames, and then combines the object frames to create program guide objects. CPU 74 examines the checksum transmitted within each object frame, and verifies whether the frame data was accurately received. If the object frame was not accurately received, it is discarded from memory 78. Also during the object assembly step, receiver 64 discards assembled objects that are of an object type that receiver 64 does not recognize. Receiver 64 maintains a list of known object types in memory 78. CPU 74 examines the object header of each received object to determine the object type. CPU 74 compares the object type of each received object to the list of known object types stored in memory 78.

If the object type of an object is not found in the list of known object types, the object is discarded from memory 78.

The last step performed by CPU 74 on received program guide data is object processing. During the object processing step, the objects stored in the guide database are combined to create a digital image of a program guide. The digital image of the program guide is later converted to an analog signal that is sent to television 66 for display to a user.

When a conditional object is received and stored in memory 78, CPU 74 evaluates the conditional expression or expressions contained in the conditional object and processes the data in the conditional object only if the conditional expressions evaluate to "TRUE". An example of such a conditional expression is "if the receiver model number stored in memory 78 is 999999, then process the data in the conditional object." CPU evaluates this expression by comparing the receiver model number stored in memory 78, and processes the data in the conditional object only if the receiver model number is "999999". Similarly, conditional objects can be limited to use by receivers only in certain area codes or zip codes.

IV. Processing of Channel Objects

Users select a particular channel to watch on television 66 using remote control 86. Remote control 86 emits infrared signals that are received by infrared (IR) receiver 84 in receiver 64. Other types of data entry devices may be alternatively be used, such as an ultra-high frequency (UHF) remote control, a keypad on receiver 64, a remote keyboard and a remote mouse. Channels are preferably selected using remote control 86 to navigate around an electronic television program guide, such as program guide 100 shown in FIG. 4, which is generated by receiver 64 and displayed on television 66. Channels may also be selected by entering a channel number with remote control 86.

Figure 4:
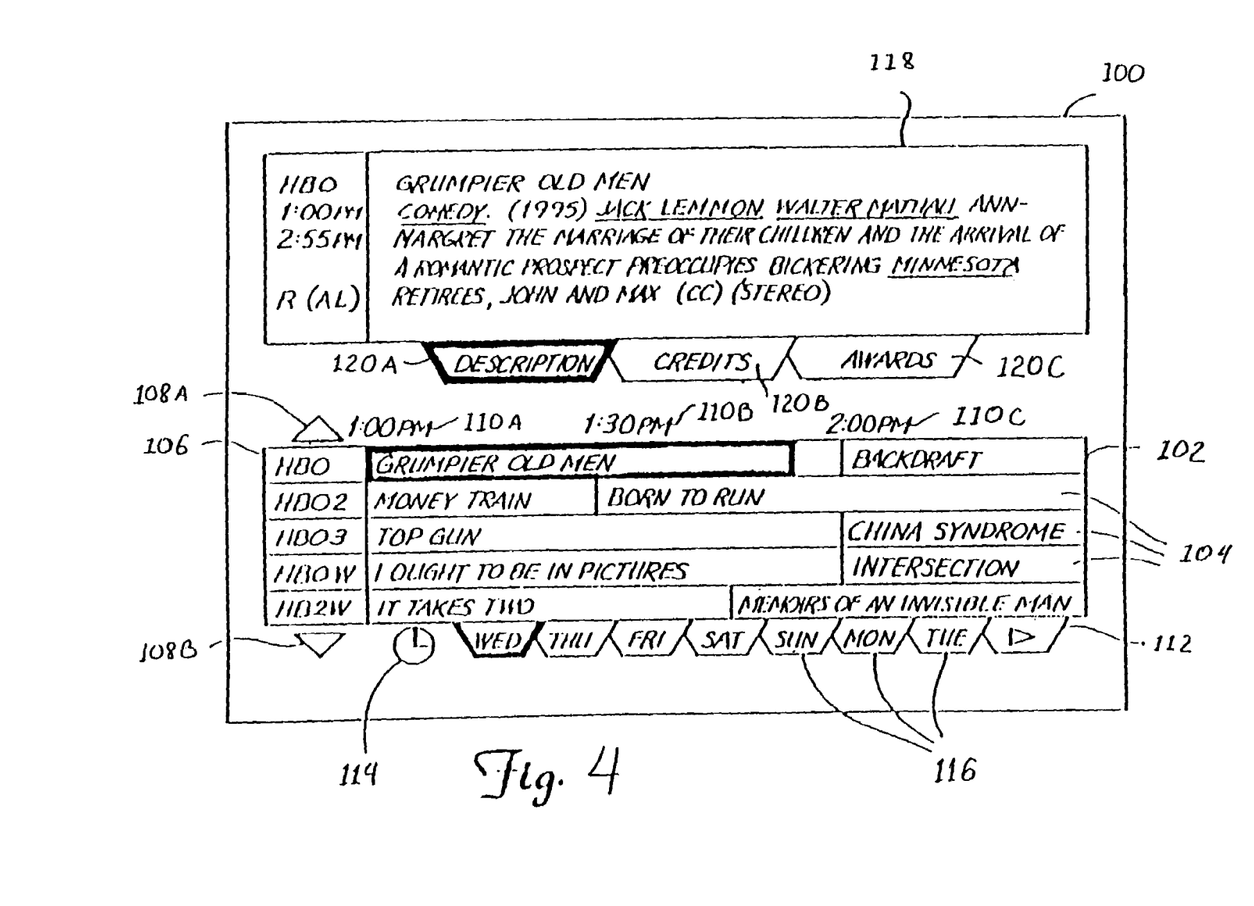
FIG. 4 is a diagram of an electronic television program guide.

FIG. 4 is a diagram of electronic television program guide 100. Program guide 100 is displayed on a television, and provides information about the timing and content of various television programs. Program guide 100 may alternatively be displayed on other types of display devices, such as on a liquid crystal display (LCD) panel.

Program guide 100 includes grid 102, cells 104, channel list 106, scroll buttons 108A and 108B, time indicators 110A–110C (collectively referred to as time indicators 110), jump button 112, time button 114, day indicators 116, information window 118, and category buttons 120A, 120B and 120C (collectively referred to as category buttons 120). The various buttons and cells are highlighted by navigating around program guide 100 using remote control 86.

Grid 102 consists of a plurality of cells 104. Each cell 104 includes a program title, and may provide additional information. Channel list 106 includes a list of channel names or channel numbers, or both. Channel list 106 may also include icons, such as icons that represent particular channels. The names and channel numbers for each entry in channel list 106 are obtained from the channel object for that entry. Time indicators 110A, 110B and 110C (referred to collectively as "time indicators 110") indicate start and end times of the various programs displayed in grid 102. Although half-hour time blocks (a time block is the length of time between two time indicators 110) are shown in program guide 100, other time block lengths may be used. Scroll buttons 108A and 108B allow users to scroll up and down channel list 106 and display different channels. Day indicators 116 indicate the day for which program information is presently being displayed. In FIG. 4, day indicators 116 indicate that the displayed guide information is for Wednesday. Jump button 112 allows users to skip to program information for a different day than that presently displayed. Time button 114 allows users to skip to program information for a different time than that presently displayed.

Information window 118 provides additional information about programs displayed in grid 102. The type of information displayed in information window 118 depends on which category button 120A–120C is currently selected. Users select one of category buttons 120A–120C using remote control 86. As shown in FIG. 4, the "Description" category is selected. Therefore, when a particular program is selected from grid 102 by remote control 86, a description of that program is displayed in information window 118. In FIG. 4, the program "Grumpier Old Men" was selected from grid 102, so a description of that program is displayed in information window 118. Similarly, if category button 120B or 120C were selected, credits information or awards information, respectively, for "Grumpier Old Men" would be displayed in information window 118. Other types of category buttons 120 may also be used to display additional categories of information.

Program guide 100 preferably includes schedule information for numerous channels, including DSS channels, ATSC channels and NTSC channels, regardless of whether the channel content is actually transmitted by television broadcasting system 20. For instance, the embodiment shown in FIG. 3 includes television content generated by alternate content source 62. Program guide 100 preferably includes schedule information for the television content generated by alternate content source 62.

Receiver 64 preferably keeps track of a user's viewing history and stores this information in a selection history table in memory 78. For each program that is shown in program guide 100, receiver 64 stores a category descriptor that identifies the type or category of the program. Category descriptors preferably provide a two-tiered category classification, such as "sports/baseball" or "movie/drama", although any number of tiers may be used including single tiers. CPU 74 keeps track of the program selections made by users, and stores the category descriptors for selected programs in the selection history table. The selection history table is initially empty when receiver 64 is first purchased. Each time a user makes a program selection, CPU 74 adds the category descriptor for the selected program to the selection history table. CPU 74 also preferably keeps track of the amount of time each program is watched and stores the times in the selection history table. If programs are watched for a time that is less than a set threshold, such as 30 seconds, the category descriptors for those programs are not stored in the selection history table.

When a user selects a channel using remote control 86, IR receiver 84 relays the user's selection to logic circuit 80, which then passes the selection on to memory 78 where it is accessed by CPU 74. CPU 74 examines the channel object for the selected channel. The channel object will either have a single channel definition or a channel content descriptor containing multiple channel definitions and conditional logic. If a single channel definition is provided in the channel object, CPU 74 uses that channel definition to construct the channel content. If a channel descriptor is provided in the channel object, CPU 74 evaluates the conditional expressions associated with each channel definition, and uses the channel definition for which the conditional expression or expressions are evaluated to "TRUE".

When the appropriate channel definition is identified, CPU 74 processes the channel definition and constructs the channel content.

The first step performed by CPU 74 in processing a channel definition is to identify the SPI number. After CPU 74 identifies the SPI number, it processes the "if-then" statements associated with the channel definition until it finds a match. When CPU 74 finds a match (i.e., it finds an "if-then" expression that evaluates to "TRUE"), CPU 74 uses the channel definition parameters associated with that conditional expression, in conjunction with the channel composition table, to construct the channel content.

The channel composition table is stored in memory 78 and may be updated or changed by transmitting a new table of entries from transmission station 26. In addition to indicating the type of channel that has been requested (e.g., DSS, ATSC, NTSC, HTML, etc.), the channel composition table also indicates the specific types of information carried on the requested channel (e.g., GTV+DAVID+AC3). This information is used by CPU 74 to identify the channel components that are needed to construct the content for the selected channel.

If the SPI in the appropriate channel definition indicates that the selected channel is a DSS channel, the channel definition parameters will include a transponder parameter and a root SCID parameter. The transponder parameter identifies an index in a frequency table for a DSS network. Based on the transponder parameter, CPU 74 determines the appropriate frequency or channel on which the channel content should be obtained, and causes tuner 70 to output the channel content of that channel. The root SCID parameter is used in conjunction with the SPI to identify the video, audio and/or data SCIDs for the selected channel. CPU 74 causes tuner 70 to output packets having SCIDs identified by the root SCID parameter to D/A converter 72. D/A converter 72 performs an MPEG2 decoding step on received packets, converts the packets to analog signals, and outputs the analog signals to television 66. Television 66 may be an alternative display device, such as a digital television. In such case, no analog conversion is necessary.

If the SPI in the appropriate channel definition indicates that the selected channel is an ATSC channel, the channel definition parameters will include an ATSC channel number parameter and an ATSC program number parameter. ATSC channels are preferably provided by alternate content source 62. CPU 74 uses the ATSC channel number parameter and ATSC program number parameter to cause tuner 70 to output the appropriate television channel from alternate content source 62 to D/A converter 72. D/A converter 72 converts the digital television signal from tuner 70 to an analog signal, and outputs the analog signal to television 66.

If the SPI in the appropriate channel definition indicates that the selected channel is an NTSC channel, the channel definition parameters will include an NTSC channel number parameter. In addition to providing ATSC channels, alternate content source 62 also preferably provides NTSC channels. CPU 74 uses the NTSC channel number parameter to cause tuner 70 to output the appropriate television channel from alternate content source 62 to D/A converter 72. Since the selected NTSC signal is already analog, the NTSC signal passes through D/A converter 72 with no digital to analog conversion.

If the SPI in the appropriate channel definition indicates that the selected channel is an HTML channel, the channel definition parameters will include an HTML object ID parameter. The HTML object ID parameter identifies the object IDs for the HTML objects associated with the channel. HTML objects include text, image files in various formats such as GIF and JPEG, and video files in various formats such as Quicktime and MPEG. When receiver 64 receives HTML objects, receiver 64 stores the objects in memory 78. When an HTML channel is selected, CPU 74 uses the HTML object ID parameter to locate the appropriate HTML objects in memory 78. CPU 74 then combines the HTML objects identified by the HTML object ID parameter and constructs a digital image of the HTML content to be displayed. CPU 74 instructs memory 78 to transfer the digital image of the HTML content to D/A converter 72. D/A converter 72 converts the digital image of the web page into an analog NTSC television signal and transmits the signal to television 66 for display.

If the SPI in the appropriate channel definition indicates that the selected channel is a combined channel (i.e., HTML content combined with DSS content, or ATSC content or NTSC content), the channel definition parameters will include an HTML object ID parameter, as well as the parameters for the DSS content, ATSC content or NTSC content. The individual parameters are processed by CPU 74 as discussed above. However, before the television content is transmitted to television 66 for display, the digital image of the HTML content transmitted from memory 78 to D/A converter 72 is combined with the DSS content, ATSC content or NTSC content. The combined signal is then provided to television 66 for display. The HTML content appears as an overlay on the DSS content, ATSC content or NTSC content.

If the SPI in the appropriate channel definition indicates that the selected channel is an explicitly defined channel, the channel definition parameters include a service type parameter, transponder or channel number parameter, and SCID or program number parameter. The service type parameter indicates a type of service, such as an audio type (e.g., Dolby Digital AC3), video type (e.g., DAVID), channel type (e.g., NTSC or ATSC) or data type (e.g., high speed data). The transponder or channel number parameter identifies either an index in a frequency table for a DSS—network, or a channel number for an ATSC network or an NTSC network. CPU 74 uses the service type parameter and transponder or channel number parameter to identify the channel or frequency of the television content, and causes tuner 70 to output the television content to D/A converter 72. CPU 74 also uses the SCID or program number parameter to identify SCIDs for a DSS channel, and to identify a program number for an ATSC channel.

V. Caching Data Applications

Television broadcast system 20 (shown in FIG. 1) of the present invention can store or cache movies or other programming and associated auxiliary data locally at receiver station 34 at the request of a viewer or upon the decision of the broadcaster. As described above with respect to FIGS. 2 and 3, combiner 42 of transmission station 26 groups encoded digital data (movies, television programs, etc.) into a plurality of packets and marks them with SCIDs. When the broadcaster designates a program to cache, the broadcaster informs receiver stations 34 about the designated program. Transmission station 26 transmits a boot object, which identifies among other things the SCIDs where all cache program objects are located. A cache program object identifies the transponder frequency and the SCIDs where data for a particular cache program can be found. The information from the cache program object is used by tuner 70 to identify packets of cache program data.

CPU 74 compares the SCIDs from the cache program objects to the authorization parameters (based on service subscription criteria) contained in memory 78 or access card 88. If receiver 64 has authorization to locally store a particular program identified by the cache program object, CPU 74 stores the identification from the cache program object in memory 78. CPU 74 then instructs tuner 70 to identify packets of data for caching based on the identifications from the cache 13 program object stored in memory 78, and to direct those packets to additional cache memory 92 for storing.

In contrast, when a viewer selects a program to cache, CPU 74 stores, in memory 78, the channel where the program will appear and the date and time when the program will begin and end. CPU 74 checks clock 76 and at the appropriate time instructs tuner 70 to identify packets of data of the selected program, and to direct those packets to additional cache memory 92 for storing.

Figure 5:
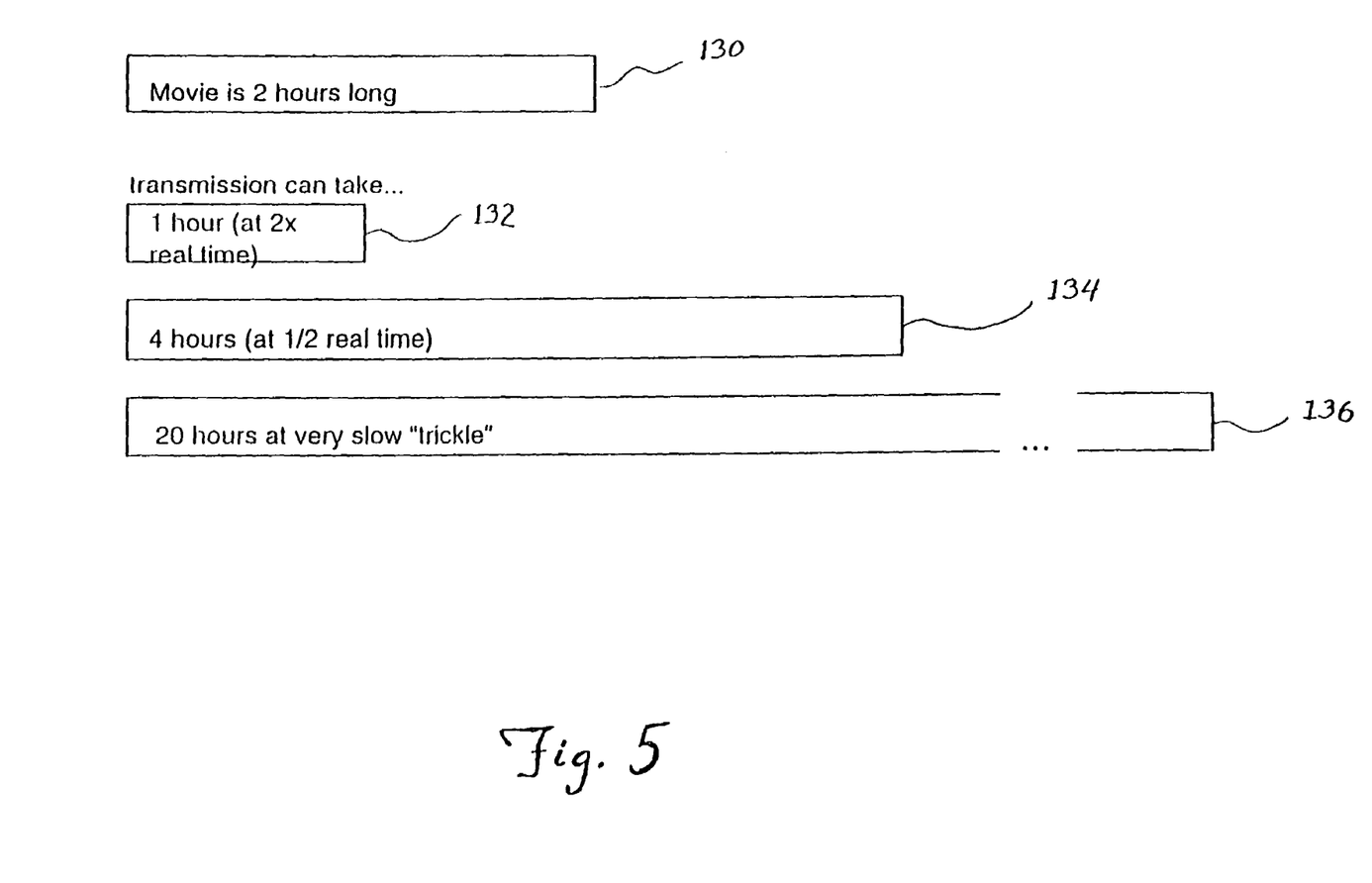
FIG. 5 is a block diagram of transmission rates of designated cache content data.

The transmission rate at which the broadcaster downloads a program to receiver stations 34 for caching depends on the particular program. As illustrated in FIG. 5, a two hour movie represented by block 130 can be recorded into additional cache memory 92 (shown in FIG. 3) as it is normally transmitted in real time. Transmitting caching data in real time allows the program to be viewed as it is simultaneously being recorded into additional cache memory 92. The first tuner of tuner 70 (shown in FIG. 3) tunes to and directs the broadcast program to viewer's television 66, while the third tuner of tuner 70 tunes to and directs the same program to a data file in additional cache memory 92.

Alternatively, a special transmission can be broadcast so that a movie is cached into additional cache memory 92, while prohibiting simultaneous viewing of that program. The broadcaster can send a high speed transmission, for instance, at two times the speed of a real time transmission, represented by block 132. The high speed data bursts allow the broadcaster to more quickly respond to a viewer's request for a program to be cached, but requires a greater amount of bandwidth. Although a viewer cannot simultaneously view a non-real time transmission, the viewer can play back a partially cached program as described below.

The broadcaster can also choose to download a selected caching program slowly causing less of a disruption to normal transmission of data. Blocks 134 and 136 represent transmission at slower rates than real time. Block 136 illustrates transmission at a trickle rate where small amounts of data are sent over a lengthy period of time. A trickle rate transmission requires less amount of bandwidth as cache data packets are inserted into output data stream 28 slowly over time. A trickle rate transmission may be appropriate when the broadcaster decides ahead of time that a particular program will be made available with the caching feature. The broadcaster will then slowly download the program a day or a week before it will be available for selection by the viewer.

Figure 6:
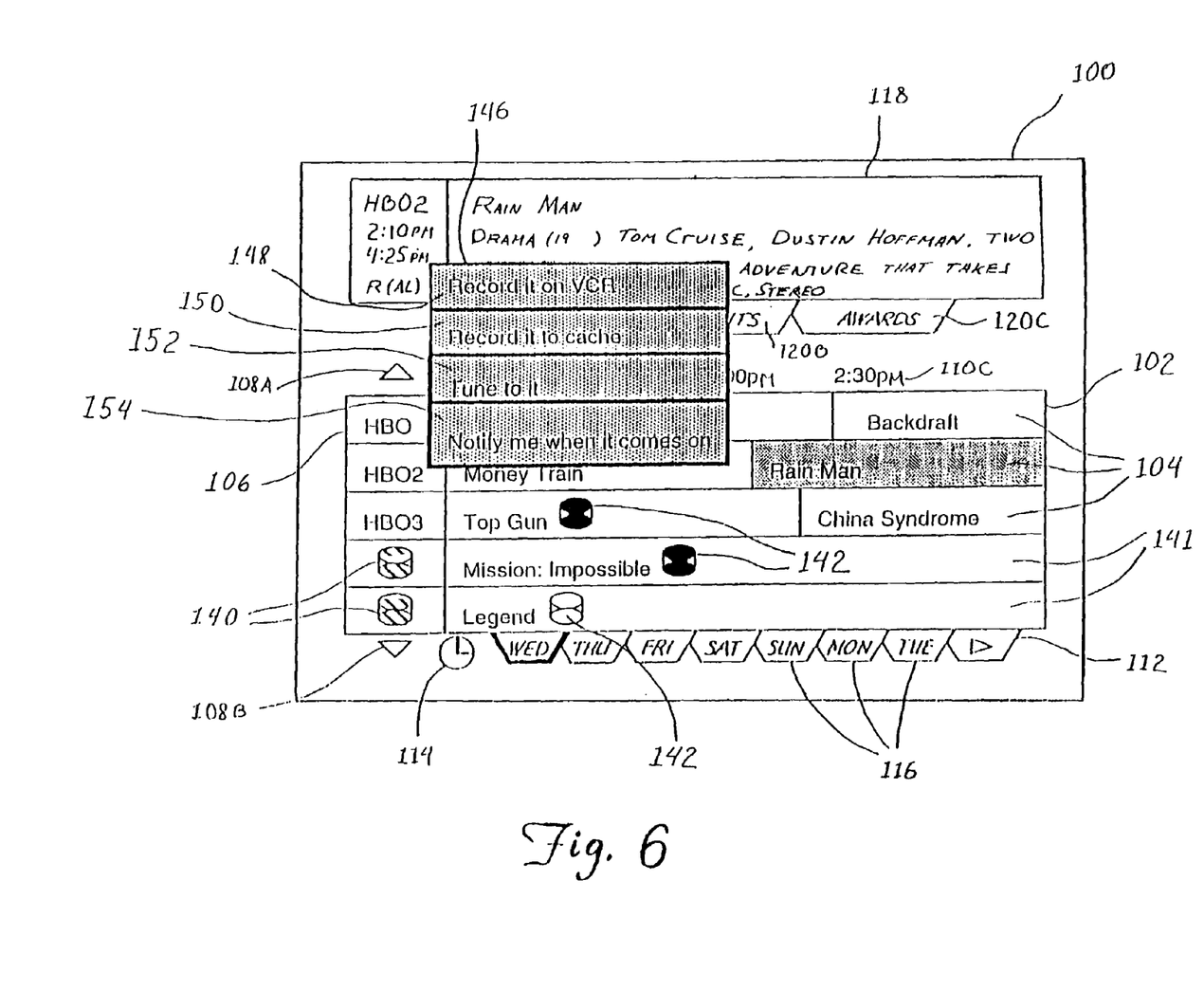
FIG. 6 is a diagram of a preferred embodiment of an electronic television program guide including caching features.
Figure 7:
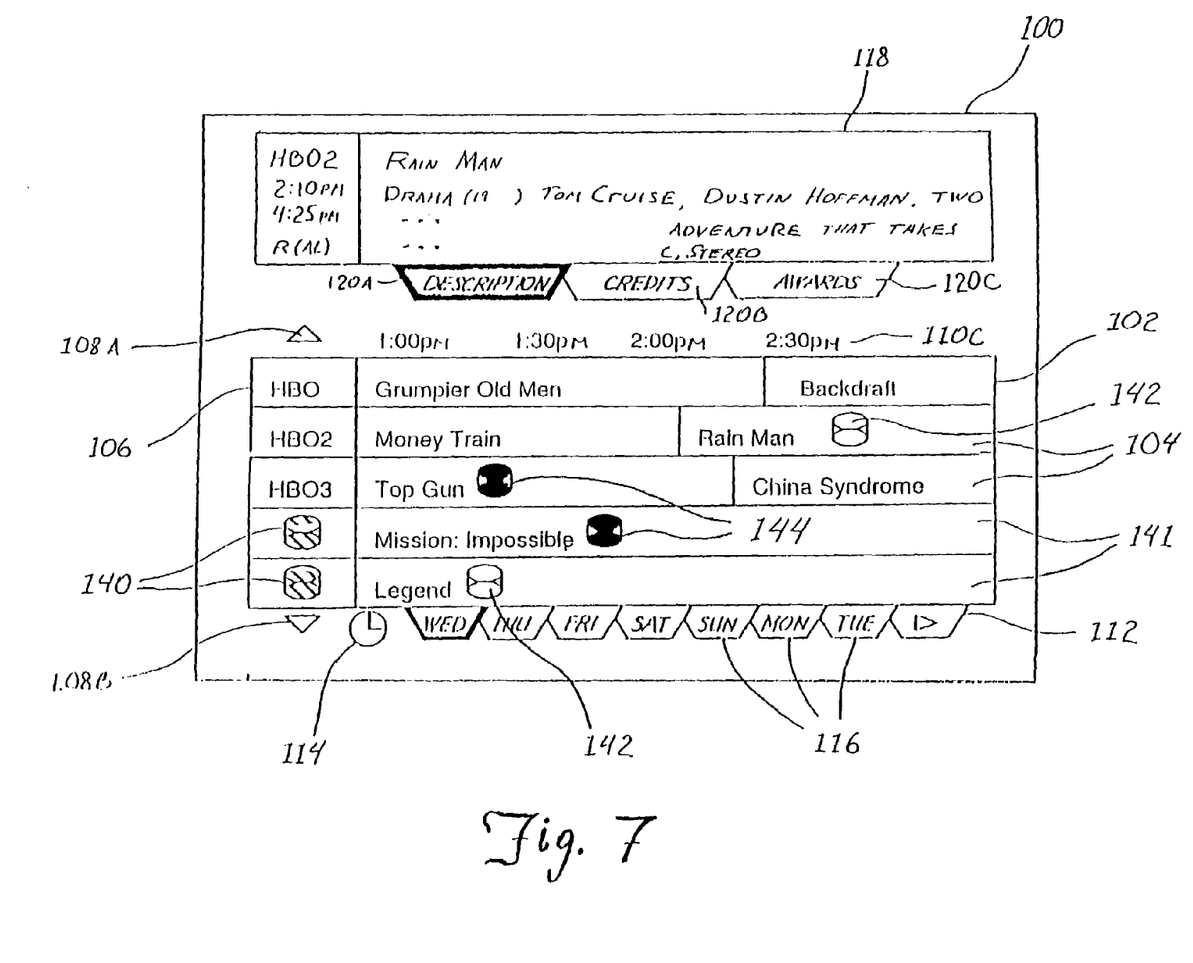
FIG. 7 is a diagram of a preferred embodiment of an electronic television program guide including caching features, wherein a viewer has selected a program for caching.

FIGS. 6 and 7 illustrate how program guide 100 incorporates the caching feature of the present invention. Program guide data corresponding to cache programming is preferably also stored in additional cache memory 92. Program guide 100 that incorporates the caching feature, additionally, includes caching channels 140, cells 141, indicators 142 and 144, and dialog box 146. Channel list 106 includes caching channels 140 in addition to channel names or channel numbers from DSS, NTSC or ATSC networks. Grid 102 includes cells 141 which identify what movie or program is stored in additional cache memory 92 and is available for viewing on a corresponding caching channel 140.

As described above, programming is cached upon request of the viewer or at the decision of the broadcaster based on service subscription criteria. Some cells 104 and 141 of grid 102 include indicators 142 and 144 to identify that the particular programs associated with those cells have been selected for recording into additional cache memory 92 by viewer (indicator 142) or broadcaster (indicator 144). The broadcaster may choose to offer a special service where certain premium movies are not only available at prescheduled broadcast times, but also available upon a viewer's request. Therefore, the broadcaster may choose to record a program into the additional cache memory 92 without the viewer's prior request, and thus making the movie or program also available for viewing at a time convenient to the viewer.

The broadcaster may also find it feasible to cache television programming for different time zones. Currently, broadcasters must use precious transmission bandwidth to rebroadcast the same programming on the West coast as was shown three hours earlier on the East coast (e.g. HBO and HBO2, Showtime and Showtime2, etc.). Instead, the broadcaster could transmit the program data only once, cache three hours of programming and automatically replay the cached program at the appropriate time. The saved bandwidth can be used to provide additional programming, and thus, generate additional revenues.

The viewer can also choose to record a program into additional cache memory 92. In FIG. 6, a viewer has selected the movie "Rain Man" using remote control 86. Cell 104 containing the "Rain Man" title is highlighted to reflect the selection. Information window 118 provides additional information about the selected program in highlighted cell 104. The viewer then pushes a select or enter button on remote control 86 prompting dialogue box 146 to appear on program guide 100. Dialogue box 146 presents a number of choices to the viewer including "Record it on VCR" option 148, "Record it to cache" option 150, "Tune to it" option 152, and "Notify me when it comes on" option 154. Selection of "Record it on VCR" option 148 causes an attached VCR (recording device 68, shown in FIG. 3) to record the program. Selection of "Tune to it" option 152 causes CPU 74 to instruct tuner 70 to tune to the channel where the selected program is being broadcast. Selection of "Notify me when it comes on" option 154 causes a notification message to be displayed on television 66 that notifies the viewer that the selected program is about to begin. Other options may be presented to the viewer in dialog box 146 depending on the type of service provided by the broadcaster.

Using remote control 86, the viewer scrolls through dialogue box 146 and selects "Record it to cache" option 150. As seen in FIG. 7, after the viewer chooses to store a program in additional cache memory 92, dialogue box 146 disappears and indicator 142 appears in cell 104 next to the title of the selected program. After the selected program is recorded into additional cache memory 92, the program title will also be displayed in cell 141 of grid 102 corresponding to a caching channel 140.

A record of the viewer's selection to locally cache a program is stored in the memory of access card 88 (shown in FIG. 3). Access card 88 keeps track of the viewer's pay-per-view ordering and other pay services buying history. At regular intervals, access card 88 communicates the viewer's buying history to the customer service center for billing purposes. The customer service center charges the viewer for ordering pay-per-view services or requesting to store a movie in additional cache memory 92 based on the information received from access card 88.

Once a program is stored as a data file in additional cache memory 92 (shown in FIG. 3) of receiver station 34, a viewer can view the program at any time. (Caching a program in an MPEG data file in additional cache memory 92 is described in Sec. III). Referring to FIG. 3, at her convenience, the viewer uses remote control 86 to select a cached program for viewing. CPU 74 locates the MPEG data file in additional cache memory 92 containing the selected program. CPU 74 retrieves data from the appropriate MPEG data file in additional cache memory 92 and loads portions of the MPEG data file into memory 78. CPU 74 then sends data from memory 78 to D/A converter 72 at a specified sampling rate. D/A converter 72 performs an MPEG2 decoding step on received data, converts data to analog signals, and outputs the analog signals to television 66. Additional portions of data from the MPEG data file in additional cache memory 92 are sent to memory 78 as necessary for uninterrupted playback.

In fact a viewer can view partially cached programs. Even if a television program is not being transmitted in real time and, as described above, a viewer can not view the incoming program, a viewer can play back what ever portion of the program is already stored in additional cache memory 92. If a viewer selects to play back a program that is partially cached, CPU 74 locates the MPEG data file, in additional cache memory 92, where the program is being cached and causes the data contained in the file to be displayed on television 66 as described above.

The caching feature of the present invention allows receiver 64 to record and store a movie or program for later viewing by the viewer at her convenience with full on-demand features. The viewer maintains control over the playback of the program. Unlike other programs which are watched as they are being transmitted, cached programs can be "paused" or "fast forwarded" or "rewound" or "replayed" at the viewer's command using remote control 86. In response to the viewer's playback command, CPU 74 adjusts the sampling rate or sampling position of the cache data. The caching feature of the present invention allows the viewer enhanced flexibility in watching programming.

The viewer can switch channels from watching a cached program to watching a regular DSS, ATSC or NTSC program, by selecting a different channel. CPU 74 then switches the input of D/A converter 72 from memory 78 containing data from the MPEG data file in additional cache memory 92 to tuner 70. Tuner 70, in turn, sends packets of data corresponding to the selected channel to D/A converter 72, which decodes the data, converts it to an analog signal and outputs the analog signal to television 66.

Figure 8:
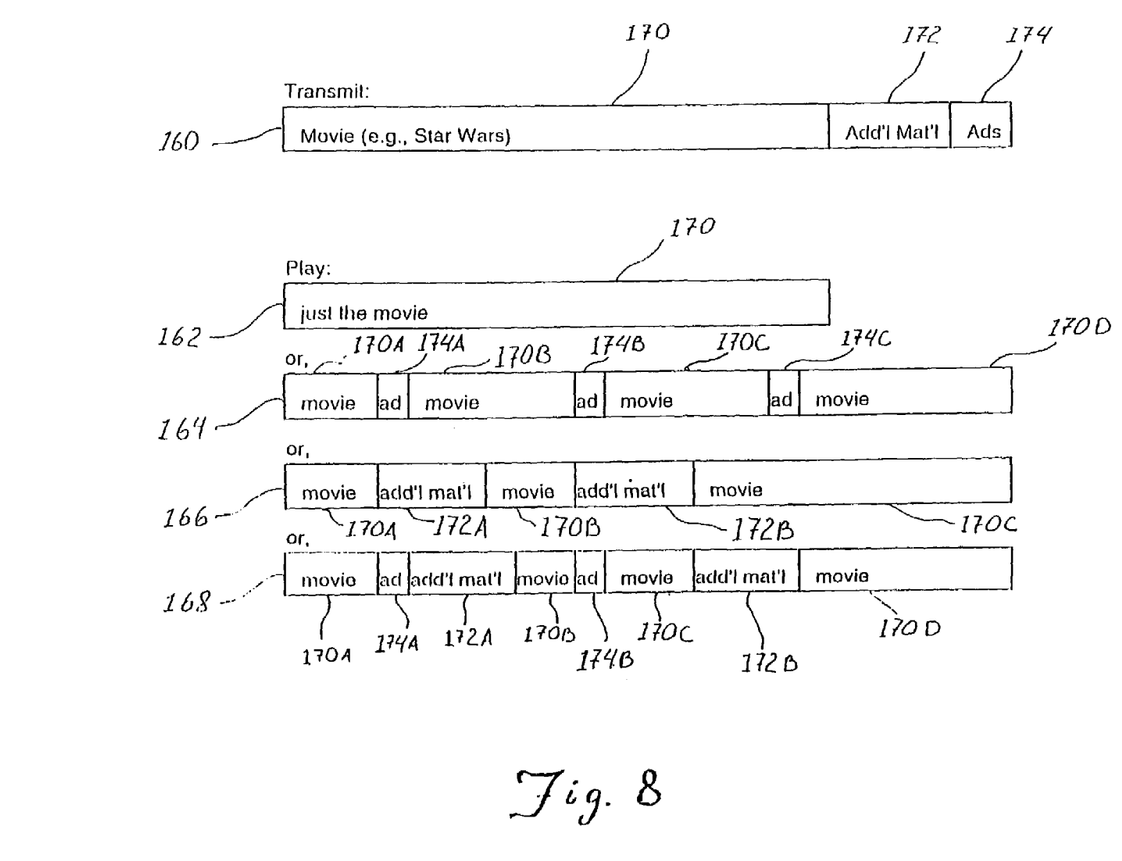
FIG. 8 is a block diagram of playback options of cached programming.

The present invention allows the broadcaster to send additional material with programs to be cached, and alter playback of the cached programs. FIG. 8 is a block diagram that illustrates how additional material can be transmitted in conjunction with a program designated to be cached locally at receiver station 34, and the available playback options incorporating additional material. FIG. 8 shows transmission stream 160 and playback options 162, 164, 166 and 168. Transmission stream 160 includes movie or program data 170, additional material data 172 and advertising material data 174. For example, the broadcaster can send a collection of edited versions of a program, "director's cuts", corresponding program guide data, associated applications, or other auxiliary material corresponding to the selected program.

Based on the intended use of additional material 172 and advertising 174 for playback of cached program 170, CPU 74 organizes and retrieves respective data packets from additional cache memory 92 (shown in FIG. 3) in appropriate order. Playback option 162 shows cached program 170 displayed in an uninterrupted format. Playback option 164 shows cached program 170 broken up into multiple segments 170A–170D and advertising segments 174A–174C interspersed between them. Playback option 166 shows cached program 170 divided into multiple segments 170A–170C and additional material segments 172A and 172B interspersed between them. Playback option 168 shows cached program 170 divided into segments 170A–170D and advertising segments 174A and 174B and additional material segments 172A and 172B interspersed between segments 170A–170D. Thus, the present invention allows a movie to be played from the additional cache memory 92 with additional material 172 or advertising 174 appearing throughout the movie.

Furthermore, the user can select to view an edited version of the program. For example, a parent can select an edited version of a movie excluding unacceptable language and adult scenes. Movie 170 will be played back with certain packets excluded and possibly additional segments 172 substituted therein. Alternatively, additional material 172 can be added to the selected program. The viewer can choose to watch the "director's cut" of the movie, where portions of the movie that were removed in the commercial version can be placed back in as the director initially intended. Sometimes scenes in a movie are shot from various angles and the viewer can select to view the movie including the alternative scenes. Additional revenues can be generated from inserting advertising segments 174 into the playback of a program. Transmitting additional material 172 and advertising 174 provides enhanced revenue and services options to the broadcaster and enhanced viewing options to the viewer.

Additional material 172 can also include program guide data and applications corresponding to a cache television program. Corresponding program guide data includes information relating to the cache television program to be displayed in electronic program guide. Corresponding applications include auxiliary data relating to any number of applications used or viewed in conjunction with a television program. For example, a broadcaster transmits the game show program "Jeopardy" and a corresponding application that allows viewers to play along with the contestants. If "Jeopardy" is designated for caching (by either the viewer or broadcaster), then both the program data (170) and the corresponding application data (172) are stored in additional cache memory 92. When a viewer later selects to view the cached "Jeopardy" program, the corresponding cached application is simultaneously played back with the program, so that the user can play along with the program as intended during real time viewing.

The present invention allows a one-way broadcast system to store locally at each receiver station full length feature films or other television programs and corresponding program guide data and applications, and to control the playback of the stored television content. The subscriber has full on-demand capabilities that are typically unavailable in one-way communication systems. The subscriber has greater viewing flexibility with the present invention.

The present invention allows the broadcaster to provide additional services and to maximize bandwidth usage. The broadcaster can provide additional pay-per-view services where the subscriber orders a movie to be locally stored and later viewed by the subscriber on-demand. The broadcaster can choose to store television content without a subscriber's prior request and thus provide a service where certain programs are automatically available to the subscriber with on-demand features. Additionally, instead of rebroadcasting programming, the broadcaster can transmit that programming once and store it locally for later viewing. Also the broadcaster can choose to transmit the television program for local storing at a rate other than real time. The present invention allows the broadcaster to maximize its available bandwidth and the ability to transmit additional programming.

Although the present invention has been described with reference to preferred embodiments, workers skilled in the art will recognize that changes may be made in from and detail without departing from the spirit and scope of the invention.

What is claimed is:

1. A method of transmitting, receiving, storing and displaying television program data, the method comprising:
   transmitting program data including scheduled program data, program guide data, cache program data comprising broadcast programming of one or more television programs, and a boot object having location information associated with the cache program data and requiring storage of the cache program data;
   receiving the program data;
   storing the cache program data based on location information stored in the boot object;
   selecting a cache television program:
   retrieving a portion of the cache program data that corresponds to the selected cache television program; and
   generating a display of the selected cache television program for viewing based upon the retrieved portion of cache program data.

2. The method of claim 1 wherein the storing of the cache program is based upon identifying an identifier associated with the cache program data.

3. The method of claim 1 wherein a transmission rate of the cache program data is different than a retrieval rate of the cache program data.

4. The method of claim 1 wherein a transmission rate of the cache program data is higher than the retrieval rate of the cache program data.

5. The method of claim 1 wherein a transmission rate of the cache program data is approximately twice the retrieval rate of the cache program data.

6. The method of claim 1 wherein a transmission rate of the cache program data is lower than the retrieval rate of the cache program data.

7. The method of claim 2 further comprising:
   transmitting identification data that instructs a receiver about the identifier associated with the cache program data.

8. The method of claim 7 further comprising:
   maintaining a record of selection representing selected cache television programs and assessing a fee based upon the record of selection.

9. The method of claim 8 wherein the record of selection is maintained at the receiver.

10. The method of claim 8 wherein the record of selection is maintained in a memory of an access card at the receiver.

11. A method to transmit television content and program data, the method comprising:
    organizing program data including scheduled program data, program guide data, and cache program data comprising broadcast programming of one or more television programs into objects; and
    transmitting the program data and a boot object having a cache program object to identity location information associated with the cache program data and to require storage of the cache program data.

12. A method as defined in claim 11, wherein the cache program data comprises a transmission rate different than a retrieval rate of the cache program data.

13. A method as defined in claim 11, wherein the cache program data comprises a transmission rate higher than the retrieval rate of the cache program data.

14. A method as defined in claim 1 wherein the cache program data comprises a transmission rate lower than the retrieval rate of the cache program data.

15. A method as defined in claim 11, wherein the boot object comprises a service channel identification (SCID) number identifying the location of the cache program data.

16. A method to process television content and program data, the method comprising:
    receiving program data including scheduled program data, program guide data, and cache program data comprising broadcast programming of one or more television programs, and a boot object having location information associated with the cache program data and requiring storage of the cache program data;
    storing the cache program data based on location information stored in the boot object;
    selecting a cache television program;
    retrieving a portion of the cache program data that corresponds to the selected cache television program; and
    generating a display of the selected cache television program for viewing based upon the retrieved portion of cache program data.

17. A method as defined in claim 16, wherein the cache program data comprises a transmission rate different than a retrieval rate of the cache program data.

18. A method as defined in claim 16, wherein the cache program data comprises a transmission rate higher than the retrieval rate of the cache program data.

19. A method as defined in claim 16, wherein the cache program data comprises a transmission rate lower than the retrieval rate of the cache program data.

20. A method as defined in claim 16, wherein the boot object comprises a service channel identification (SCID) number identifying the location of the cache program data.

21. A method as defined in claim 1, wherein the cache program data comprises at least one of video data and audio data of broadcast programming.

22. A method as defined in claim 11, wherein the cache program data comprises at least one of video data and audio data of broadcast programming.

23. A method as defined in claim 16, wherein the cache program data comprises at least one of video data and audio data of broadcast programming.

* * * * *